(12) United States Patent
Bauer et al.

(10) Patent No.: US 6,755,640 B2
(45) Date of Patent: Jun. 29, 2004

(54) PLASTICS INJECTION MOLDING MACHINE

(75) Inventors: Markus Bauer, Munich (DE); Martin Wurtele, Friedberg (DE); Erwin Burkle, Benediktbeuern (DE); Helmut Horl, Grobenzell (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 46 days.

(21) Appl. No.: 10/282,152

(22) Filed: Oct. 28, 2002

(65) Prior Publication Data

US 2003/0082265 A1 May 1, 2003

(30) Foreign Application Priority Data

Oct. 31, 2001 (DE) .......................................... 101 53 704

(51) Int. Cl.[7] .............................................. B29C 45/72
(52) U.S. Cl. .................................. 425/551; 264/328.14
(58) Field of Search .................................. 425/143, 144, 425/170, 547, 548, 550, 551, 562; 264/328.14, 328.15, 328.16, 521, 319

(56) References Cited

U.S. PATENT DOCUMENTS 4,591,467 A    5/1986   Kopernicky 6,435,853 B1 * 8/2002   Teraoka et al. ............. 425/562

FOREIGN PATENT DOCUMENTS

| DE | 32 12 796 C1 | 11/1983 |
| DE | 2 27 644 A1 | 9/1985 |
| DE | 41 20 403 A1 | 12/1992 |
| DE | 196 03 036 A | 7/1997 |
| DE | 198 31 483 A1 | 1/2000 |
| EP | 01 22 885 B1 | 11/1989 |
| JP | 10 100215 A | 4/1998 |
| WO | WO 88/00116 | * 1/1988 |

* cited by examiner

Primary Examiner—Tim Heitbrink
(74) Attorney, Agent, or Firm—Henry M. Feiereisen

(57) ABSTRACT

A plastics injection molding machine includes a heatable plasticizing cylinder having an inlet side for incoming plastic material and a machine drive, and an injection mold receiving the plastic material from the plasticizing cylinder for making an injection molded article. Acting between the machine drive and the inlet side of the plasticizing cylinder is a heat transport system for preheating the incoming plastic material with waste heat generated by the machine drive to thereby realize a recovery of energy.

9 Claims, 1 Drawing Sheet

PLASTICS INJECTION MOLDING MACHINE

CROSS-REFERENCES TO RELATED APPLICATIONS

This application claims the priority of German Patent Application, Serial No. 101 53 704.2, filed Oct. 31, 2001, pursuant to 35 U.S.C. 119(a)(d), the disclosure of which is incorporated herein by reference.

BACKGROUND OF THE INVENTION

The present invention relates, in general, to a plastics injection molding machine.

German Pat. NO. DE 41 20 403 C2 describes an injection molding machine having an injection mold which is heated and cooled alternately at timed intervals and constructed to use the waste heat from a machine drive to heat the injection mold. The injection mold should be heated as rapidly as possible to an elevated temperature level, which means that a heat source is required that is able to produce such heat in a very short period. On the other hand, the machine drive produces only a fairly even heat amount, independent on the heating and cooling cycles of the injection mold. In addition, this heat amount is insufficient for realizing a quick heating action of the injection mold. Thus, the use of waste heat is possible only to a limited extent, and the provision of an additional heat energy source is therefore required.

This conventional injection molding machine further describes the use of an air stream, which has been heated previously in a heat protection jacket of the plasticizing cylinder, for drying the plastic material in a granulate reservoir, upstream of the plasticizing cylinder. However, only a fraction of the heat amount to be supplied to the air stream can hereby be provided by the insulation losses of the heat protection jacket. The remaining part must be generated by an increased withdrawal of useful heat of the plasticizing cylinder, so that the energy saving aspect during the drying process is accompanied by a respective greater energy consumption during heating of the plasticizing cylinder.

It would therefore be desirable and advantageous to provide an improved injection molding machine to obviate prior art shortcomings and to significantly reduce the energy consumption.

SUMMARY OF THE INVENTION

According to one aspect of the present invention, a plastics injection molding machine, includes a heatable plasticizing cylinder having an inlet side for incoming plastic material and a machine drive, an injection mold receiving the plastic material from the plasticizing cylinder for making an injection molded article, and a heat transport system acting between the machine drive and the inlet side of the plasticizing cylinder for preheating the incoming plastic material with waste heat from the machine drive for recovery of energy.

The present invention resolves prior art problems by providing a heat transport system which directly and continuously preheats the plastic granulate on the inlet side of the plasticizing cylinder with waste heat of the machine, without need for a complicated intermediate reservoir or additional energy consumption, so as to realize an extremely effective waste heat exploitation. In this way, not only the heat energy consumption of the plasticizing cylinder, required for the melting process, can be significantly reduced but also the melting zone of the plasticizing cylinder can be shortened and the productivity of the plasticizing drive is significantly improved as a consequence of the resultant smaller pressure rise in the area of the melting zone.

According to another feature of the present invention, the machine drive may include a central electro-hydraulic motor and pump unit, wherein the heat transport system preheats the incoming plastic material with waste heat from the motor and pump unit.

According to another feature of the present invention, the machine drive may include a screw drive secured at the inlet side of the plasticizing cylinder, wherein the heat transport-system is linked in a heat-absorbing manner to the screw drive at an attachment zone to the plasticizing cylinder. In this way, the waste heat use is further improved and the screw drive is effectively protected from overheating.

According to another feature of the present invention, there is provided a feed hopper at the inlet side of the plasticizing cylinder, whereby the plastic material is preheated in the feed hopper. This configuration is especially easy to implement.

According to another feature of the present invention, the heat transport system may be a pipe system circulated by water in a closed circuit. This configuration is easy to implement and is thermally effective.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
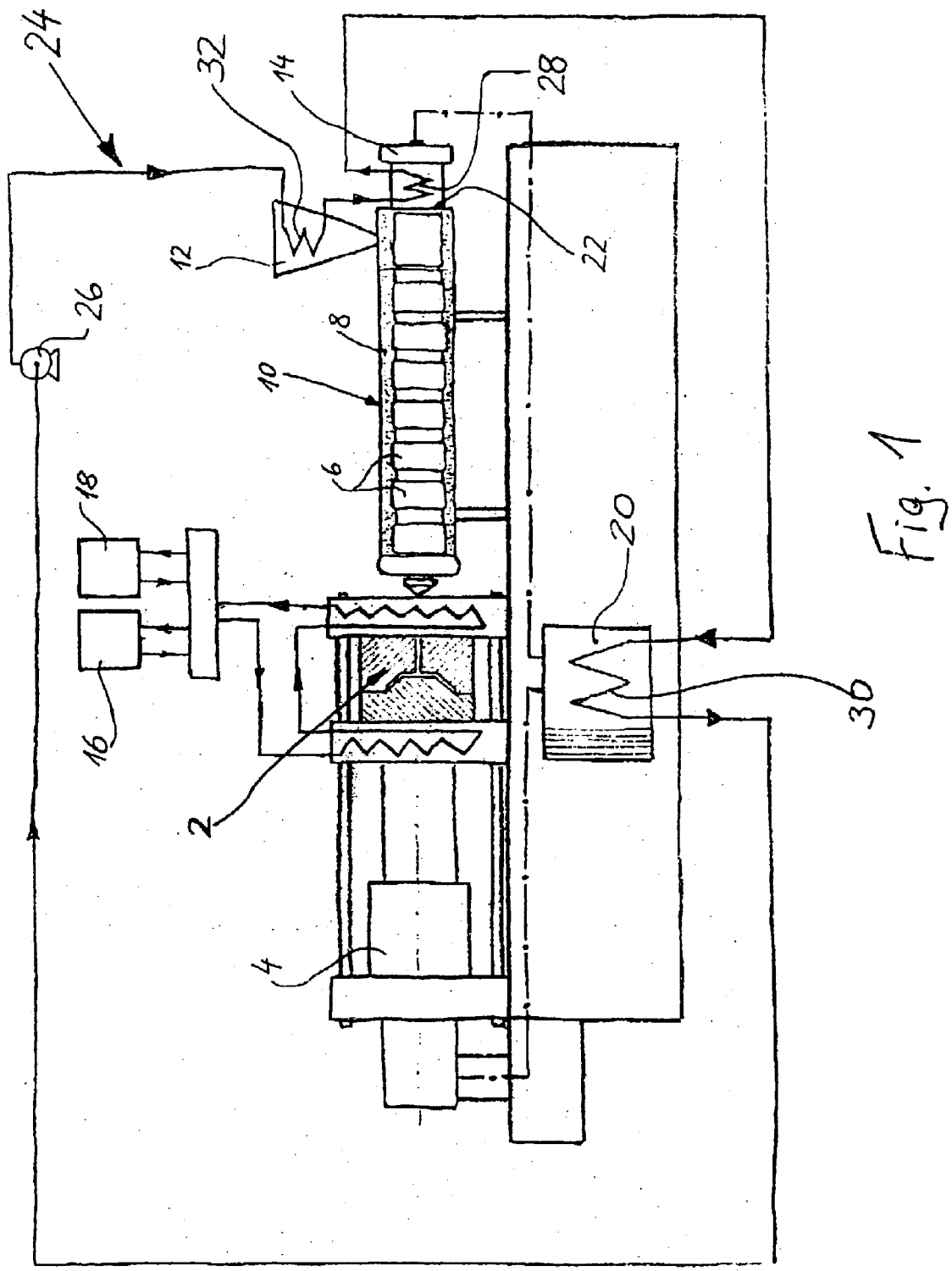
FIG. 1 is a greatly schematic illustration of a plastics injection molding machine according to the present invention.

Turning now to FIG. 1, there is shown a schematic illustration of a plastics injection molding machine according to the present invention, including as main components an injection mold, generally designated by reference numeral 2, for injection-molding molten plastic material fed thereto. The injection mold 2 can be opened and closed in a clock-controlled manner by a hydraulic adjustment drive 4. Supply of molten plastic material into the injection mold 2 is implemented by an extruder having a plasticizing cylinder, generally designated by reference numeral 10, which is embraced by heating elements 6 and insulated against the outside by a heat protection jacket 8. At its upstream end, which is distal to the injection mold 2, the plasticizing cylinder 10 includes a feed hopper 12 for introduction of granular thermoplastic material into the plasticizing cylinder 10. The cylinder 10 contains an extruder screw (not shown) for transporting the plastic material through the cylinder 10 from the feed zone in the area of the hopper 12 via a plasticizing zone to the discharge zone for transfer to the injection mold 2. A hydraulically operated screw drive 14 drives the extruder screw and is mounted via an attachment flange 22 at the upstream end of the plasticizing cylinder 10. Under the influence of the heating elements 6, the introduced plastic material is melted and compressed, mixed and conveyed to the downstream end of the plasticizing cylinder 10 on the outlet side for intermittent charging of the injection mold 2 with plastic melt in synchronism with the closing state of the injection mold 2.

In order to sufficiently heat the injection mold 2 during the charging operation, the-injection mold 2 is controlled in clocked manner for alternating heating and then cooling after the charging operation to implement a fastest possible solidification and extraction of the finished article. The injection mold 2 is hereby controlled alternately by a circulation 16 of a heating medium and circulation 18 of a coolant.

Both, the hydraulic screw drive 14 and the hydraulic adjustment drive 4, Are supplied with a pressure medium from a heavy-duty, electro-hydraulic central unit 20, e.g. an electro-hydraulic motor and pump unit. The central unit 20 as well as the hydraulic screw drive 14 have to be cooled for protection against overheating. A recuperation of the thermal energy released hereby is realized by providing the injection molding machine with a heat transport system, generally designated by reference numeral 24 and constructed in the form of a pipe system with circulating water in a closed circuit. The heat transport system 24 includes a circulating pump 26, a first heat exchanger 28 in the area of the attachment flange 22 at the upstream end of the plasticizing cylinder 10 for coolingthe hydraulic screw drive 14, and a second heat exchanger 30 for cooling the central unit 20.

Waste heat generated by the hydraulic screw drive 14 and the central unit 20 is thus transferred to the heat transport system 24 and then utilized via a further heat exchanger 32 in the hopper 12 or preheating the plastic granulate immediately before entry into the plasticizing cylinder 10. As a result, the otherwise existing energy losses caused by the operation of the hydraulic screw drive 14 and the central unit 20 are now utilized as useful heat and returned into the injection molding process for elevating the initial temperature of the starting product so that the energy consumption of the heating elements 6 for implementing a melting of the plastic material is significantly reduced. At the same time, the melting zone of the plasticizing cylinder 10 is shortened, resulting in a reduced structural length and in an increase of the plasticizing power of the hydraulic screw drive 14 in view of the reduced compression in the area of the melting zone.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A plastics injection molding machine, comprising: a heatable plasticizing cylinder having an inlet side for incoming plastic material and a machine drive for operating a screw in the plasticizing cylinder and for operating an injection mold for receiving the incoming plastic material from the plasticizing cylinder for making an injection molded article; and a heat transport system acting between the machine drive and the inlet side of the plasticizing cylinder for preheating the incoming plastic material with waste heat generated by the machine drive for recovery of energy.

2. The injection molding machine of claim 1, wherein the machine drive includes an efectro-hydraulic motor and pump unit, said heat transport system preheating the incoming plastic material with waste heat from the motor and pump unit.

3. The injection molding machine of claim 1, wherein the machine drive includes a screw drive secured at the inlet side of the plasticizing cylinder, said heat transport system being linked in a heat-absorbing manner to the screw drive at an attachment zone to the plasticizing cylinder.

4. The injection molding machine of claim 1, and further comprising a feed hopper at the inlet side of the plasticizing cylinder, said heat transport system being constructed to preheat the incoming plastic material in the feed hopper.

5. The injection molding machine of claim 1, wherein the heat transport system is a pipe system circulated by water in a closed circuit.

6. An injection molding machine, comprising: an injection mold;

an extruder having a plasticizing cylinder provided with an inlet for entry of plastic material into the plasticizing cylinder, and a screw contained in the plasticizing cylinder for moving the plastic material through the plasticizing cylinder for introduction into the injection mold as a molten mass;

drive means operating the screw and operating the injection mold; and a heat transport system interacting with the drive means for transferring waste heat generated by the drive means for preheating the plastic material entering the plasticizing cylinder through the inlet.

7. The injection molding machine of claim 6, wherein the drive means includes a screw drive for operating the screw, and an electro-hydraulic motor and pump unit for supply of pressure medium to the screw drive.

8. The injection molding machine of claim 6, wherein the extruder includes a feed hopper mounted at the inlet of the plasticizing cylinder, said heat transport system including a first heat exchanger contained in the feed hopper for preheating the plastic material.

9. The injection molding machine of claim 6, wherein the heat transport system includes a water-circulating pipe system with a heat exchanger interacting with the screw drive and a heat exchanger interacting with the motor and pump unit.

* * * * *